United States Patent [19]

Jones

[11] 4,008,204
[45] Feb. 15, 1977

[54] POLYSULPHONES AS INSULATORS

[75] Inventor: Michael Edward Benet Jones, Runcorn, England

[73] Assignee: Imperial Chemical Industries Limited, London, England

[22] Filed: Aug. 25, 1972

[21] Appl. No.: 283,656

Related U.S. Application Data

[60] Continuation of Ser. No. 126,970, March 22, 1971, abandoned, which is a division of Ser. No. 320,508, Oct. 31, 1963.

[30] Foreign Application Priority Data

Nov. 6, 1962    United Kingdom ............ 41976/62
Mar. 18, 1963    United Kingdom ............ 10592/63
Oct. 3, 1963    United Kingdom ............ 38973/63

[52] U.S. Cl. ............................ 260/49; 174/137 A; 260/79.3 M
[51] Int. Cl.$^2$ ................. C08G 75/20; C08G 75/23
[58] Field of Search ....................... 260/49, 79.3 M

[56] References Cited

OTHER PUBLICATIONS

Volk et al., Electrical Encapsulation, Reinhold, New York, 1962, (pp. 14–16).
Von Hipple, Dielectric Materials and Applications, Wiley, New York, 1954, (pp. 168–179).
Lythall, The J&P Switchgear Book, Wiley, New York, 1972, (Table of Contents, pp. 1, 4, 598–599, 708–709, 738–739).
Garrard, Electric Switch and Controlling Gear, Van Nostrand, New York, 1927, (pp. ix–xi).

Primary Examiner—Lester L. Lee
Attorney, Agent, or Firm—Cushman, Darby & Cushman

[57]          ABSTRACT

Switch gear containing as electrical insulant a shaped polymeric material formed of repeating units having the structure —Ar—SO$_2$—.

11 Claims, No Drawings

POLYSULPHONES AS INSULATORS

This is a continuation of application Ser. No. 126,970, filed Mar. 22, 1971 and now abandoned, as a division of Ser. No. 320,508, filed Oct. 31, 1963.

The present invention relates to the manufacture of polysulphones and also to new polymeric materials containing sulphone groups in the polymer chain.

According to the present invention we provide a process for manufacturing polysulphones which comprises melting together at least one first compound containing two aromatically bound sulphonyl halide groups and at least one second compound which contains at least two aromatically bound hydrogen atoms in the presence of from 0.05 to 5% by weight of the compounds of a salt of iron which is soluble in the polymerisable mixture or antimony pentachloride.

According to a modification of the process, at least one single organic compound containing a sulphonyl halide group and a hydrogen atom each bound to an aromatic ring may replace the combination of the aforementioned first compound and second compound.

THE MONOMERS

The first compound will have two sulphonyl halide ($-SO_2X$) groups each attached to an aromatic nucleus. They may be attached to the same or different nuclei. The nucleus may be derived from benzene or a polynuclear aromatic hydrocarbon. By a polynuclear aromatic hydrocarbon we mean a hydrocarbon containing two or more condensed rings of which at least one is aromatic. Examples are indene, naphthalene, anthracene, phenanthrene and chrysene.

However, we prefer not to use disulphonyl halides derived from compounds such as anthracene, phenanthrene or chrysene which contain three or more condensed aromatic nuclei since their use may lead to cross-linking in the polymeric products. Although this tendency may be reduced by deactivating all but two of the rings by substituting the aromatic hydrogen atoms by, for example, nitro, carboxylate, aldehyde, ketone, nitrile, sulphone, sulphate or sulphonate groups, we prefer to use polynuclear aromatic hydrocarbons containing not more than two aromatic nuclei, such as naphthalene, indene and fluorene. We further prefer to use the disulphonyl halides in which each sulphonyl halide is attached to a benzene or substituted benzene nucleus.

These compounds fall into three categories represented by the following structures:

from an organic compound containing two hydroxyl groups.

Our specified first compounds having the structure I are benzene disulphonyl halides and any or all of the four remaining aromatically-bound hydrogen atoms of the benzene ring may be replaced by other substituents, if desired. Common examples are the 1,3- and 1,4-benzene disulphonyl halides. We prefer the 1,3 derivatives because of their ease of preparation. Possible substituents for the benzene ring include, for example, monovalent hydrocarbon, ether and thioether groups and their halogen substituted derivatives, hydroxy groups, thiol groups, carboxylate groups, amine and substituted amine groups, nitro and nitroso groups, aldehyde groups, ketone groups, nitrile groups, sulphone groups, sulphonate groups, sulphate groups, and halogen atoms. We prefer the substituents, if any, to be "meta" to the $SO_2X$ groups since substitution in the ortho positions tends to cause steric hindrance to the polymerisation.

Substitution on the benzene ring tends to affect the activity of the sulphonyl halide in polymerisation and both the nature of the substituent and the position of the substitution plays a part. The effect of such substitution may be discovered by simple experimentation. We have found in general that the presence of groups which are known to activate electrophilic substitution in the meta position tends to have an adverse effect on our polymerisation and we prefer, therefore, not to use compounds having, for example, nitro, carboxylate, aldehyde, ketone, nitrile, sulphone, sulphate or sulphonate groups. Substituent groups containing active hydrogen atoms (for instance, amine, mono-substituted amine, thiol and hydroxyl groups) tend to react with the polymerisation catalysts and we prefer that they are absent also. Our preferred substituents are halogen atoms, hydrocarbon, ether and thioether groups and halogen substituted derivatives of these groups. Examples of benzene and substituted-benzene disulphonyl chlorides are benzene-1,3-disulphonyl chloride; toluene-2,4-disulphonyl chloride; toluene-3,5-disulphonyl chloride; octyl benzene-3,5-disulphonyl chloride; chlorobenzene-2,4-disulphonyl chloride and anisole-3,5-disulphonyl chloride and benzene-1,4-disulphonyl chloride.

We have found in general that where our specified first compound has both its sulphonyl halide groups attached to the same benzene ring, the polymerisation process is undesirably slow and we prefer, therefore, to use those compounds having the structure II or III. Of those having the structure II or III, we find it most

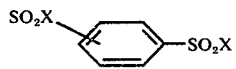

I

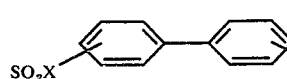

II

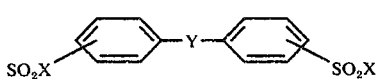

III or substituted derivatives thereof where one or more of the aromatically bound hydrogen atoms are replaced by other monovalent atoms or groups.

In III, Y represents any suitable divalent bridging radical. For instance Y may be $-O-$, $-S-$, $-SO-$, $-SO_2-$, $-CO-$, $-CO.NH-$, $-CO.O-$, $-O.CO.O-$, a divalent hydrocarbon radical, a divalent ether or thioether radical or a residue of a diol. By a residue of a diol we mean the divalent structure obtained by removing the two hydroxyl hydrogen atoms convenient to use the 4,4'-disulphonyl chloride derivatives because of their availability. Substituted derivatives of these compounds may also be used where either the hydrogen atoms of the aromatic nuclei or the hydrogen atoms attached to carbon atoms of the bridging group (if any) or both are substituted by other monovalent atoms or groups. Where the substitution is on the aromatic nuclei, the same rules for activation apply as described for further substitution of compounds having the structure I. Thus, our preferred substituents are halogen atoms, hydrocarbon, ether and thioether groups and their halogenated derivatives.

In general, we prefer that there are no large substituents in the positions ortho to the sulphonyl halide groups since such substituents tend to cause steric hindrance to the progress of the polymerisation. We further prefer that in the aromatic nuclei only the hydrogen atoms ortho to the bridging group a substituted by other atoms or groups.

In compounds of the structure III we prefer that the bridging groups are not those, such as sulphone or ketone groups, which would tend to deactivate the aromatic nuclei and therefore inhibit the polymerisation reaction, or groups (for instance sulphoxide, carbonate, carboxylate, carbamate, amido or divalent aliphatic hydrocarbon groups containing aliphatic carbon atoms in the chain between the aromatic nuclei or aliphatic diol residues) which may be unstable under the conditions of the reaction. Furthermore, where the bridging group contains an aromatic nucleus, we prefer that the said nucleus is deactivated so that it cannot take part in the polymerisation, so promoting cross-linking. We also prefer that the bridging groups are such that there are not more than 4 atoms in the chain between adjacent aromatic nuclei because with longer bridging groups the products obtained tend to have undesirably lowered softening points.

Our preferred bridging groups are oxygen atoms, sulphur atoms, and groups having the structure

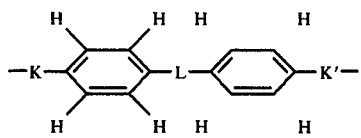

where K and K' are selected from the group consisting of oxygen and sulphur atoms and L is —CO— or —SO$_2$—.

Our specified first compounds may contain a third sulphonyl halide group where it is desired to obtain a cross-linked product.

The second compound in our two component process may be any aromatic compound containing at least two aromatically bound hydrogen atoms. The aromatic compound may be a polynuclear aromatic hydrocarbon such as indene, anthracene, phenanthrene or chrysene (but preferably one containing not more than two aromatic nuclei, such as naphthalene, indene or fluorene) or may be a compound having the structure I, II or III as hereinbefore described but replacing the sulphonyl halide groups by hydrogen atoms. Where the aromatic compound comprises a single benzene ring as in structure I it may have up to four substituents and where it has the structure II or III each benzene ring contain up to five substituents (including the bridging group) thus leaving in all cases at least two hydrogen atoms attached to aromatic nuclei.

Where substituted aromatic compounds are chosen, the preferred types and positions of the substituents on the aromatic nuclei are as described above for the disulphonyl halide compounds.

In general, we have found that if benzene or a substituted benzene is chosen as the second compound in our two-component process, the reaction is very slow and therefore we prefer to use those compounds containing the structures II or III, omitting the sulphonyl halide groups.

Thus, our preferred second compounds are those having the structure II or III where Y is an oxygen atom, a sulphur atom or a group having the structure

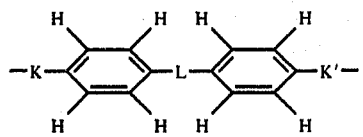

as hereinbefore defined, or substituted derivatives of structures II and III having halogen atoms, monovalent hydrocarbon, ether or thioether groups or halogen substituted derivatives thereof, preferably halogen atoms, alkyl groups containing from 1 to 4 carbon atoms or alkoxy groups containing from 1 to 4 carbon atoms, on one or more of the positions in the aromatic nuclei ortho to the bridging groups.

In general, where both the first and second compounds in the polymerisation reaction have the structure II, the products tend to be inflexible and brittle and therefore we prefer that at least one of the compounds has the structure III.

Accordingly in a preferred embodiment of our process for manufacturing polysulphones by a two-component process, the first compound is selected from those having the structure

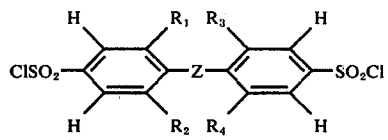

and the second compound is selected from those having the structure

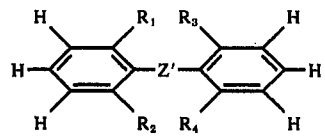

where Z and Z' are selected from the group consisting of direct linkages, oxygen atoms, sulphur atoms and groups having the structure

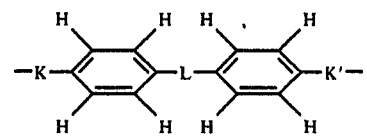

where K and K' are each selected from the group consisting of oxygen and sulphur atoms and L is —SO$_2$— or —CO—; and at least one of Z and Z' is not a direct linkage and R$_1$, R$_2$, R$_3$ and R$_4$ are each selected from the group consisting of hydrogen atoms, halogen atoms, alkyl groups containing from 1 to 4 carbon atoms and alkoxy groups containing from 1 to 4 carbon atoms.

Examples of such compounds are diphenyl, diphenyl ether, diphenyl sulphide, di-(-o-chlorophenyl) sulphide, di(2-methoxyphenyl) ether, 2-phenoxytoluene, di-3,5-dichlorophenyl ether, di-o-tolyl ether, and 4,4'- diphenoxydiphenylsulphone, and their 4,4'-disulphonyl chloride derivatives.

Mixtures of our specified first and second compounds may be polymerised by the process of the invention to give mixed polymers if desired. By careful choice of the ingredients, considerable variation of the physical properties of the polymeric products may be achieved. In general, it is preferred to use equimolar amounts of first and second components. However, where it is desired to limit the molecular weight, this may be done by adding an excess of one or other of the components. Alternatively such molecular weight control may be effected by adding to the polymerisation a monofunctional compound. By a monofunctional compound we mean one which has only one active atom or group under the conditions of the reaction. An example is a 3,5-disubstituted benzene sulphonyl halide such as 3,5-dichlorobenzene sulphonyl chloride.

In a further embodiment of the invention the disulphonyl halide compound or compounds used in the polymerisation may be replaced in part by one or more compounds containing two carbonyl halide groups each of which is bound to an aromatic nucleus. Such compounds may have the structures I, II or III but with CO.X groups in place of the $SO_2$.X groups. The preferments for these carbonyl halide compounds are in general the same as those for the disulphonyl halide compounds and the products obtained from such a polymerisation are mixed polymers containing —CO— and —$SO_2$— groups in the polymer chains. Products having a wide variety of physical properties may be obtained by varying the choice and concentrations of the compounds taking part in the polymerisation reaction. However, those containing groups derived from dicarbonyl halides generally tend to be crystalline.

In our modified process wherein the combination of first and second compounds is replaced by a single compound as described hereinbefore, any aromatic compound containing both an aromatically bound sulphonyl halide group and an aromatically bound hydrogen atom, on the same nucleus or on different nuclei, may be used. Examples are the monosulphonyl halides of benzene and polynuclear aromatic hydrocarbons (preferably containing not more than two aromatic nuclei) and compounds having the structure II and III as hereinbefore described but excluding one of the sulphonyl halide groups. The rules for the preferred choice of such compounds are the same as for the first and second compounds of our two-component process, i.e., we particularly prefer those having the structure

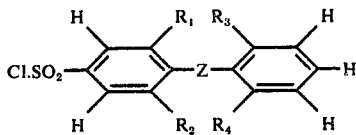

where Z, $R_1$, $R_2$, $R_3$ and $R_4$ are as defined hereinbefore.

Mixtures of these mono-sulphonyl halide compounds, to give mixed polymers, may be used if desired and where such mixtures are used, this modified process is particularly suitable because of its flexibility. Aromatic mono-carbonyl halides of similar form may also be copolymerised with these sulphonyl halide compounds to give mixed polymers. Limitation of the molecular weight of the products of this modified process may be obtained, where desired, by the addition to the polymerisation mixture of a monofunctional compound as hereinbefore defined.

It will be appreciated that an equimolar mixture of our specified first and second compounds may also be reacted with one or more of our specified monosulphonyl halides to give high polymeric products by the process of our invention. Variation of the mixture of first and second compounds from equimolar proportions will tend to reduce the molecular weight.

THE PROCESS

The polymerisation may be effected by heating together the component or components and the catalyst alone or in the presence of an inert solvent. Suitable solvents are highly polar compounds such as cyclic tetramethylene sulphone, nitromethane and nitrobenzene. However, the presence of solvents generally slows down the reaction and also, since only the low polymers tend to be soluble in the solvents, the products are generally only of low molecular weight. Furthermore, use of a solvent is economically unattractive and therefore we generally prefer to work in its absence.

In our two-component process, we prefer that the disulphonyl halide compounds and the second components be added in approximately equimolar proportions. However the proportions may be varied from equimolar quantities where it is desired to restrict the molecular weight of the products. In the modified process, where two or more components are used they may be added in any desired proportions.

Suitably, the polymerisable component or components are heated until molten and thoroughly mixed before the catalyst is added to the melt. As polymerisation continues the temperature is raised in order to maintain the ingredients in the molten state and when the maximum required temperature is reached, this is maintained for a further period of time, generally of the order of 2 to 3 hours in order to allow completion of the polymerisation. During the polymerisation, hydrogen chloride is evolved and must be removed, e.g. by effecting the reaction under vacuum. The reaction is preferably conducted in the presence of an inert gas such as nitrogen in order to ensure the absence of oxygen above the melt. Where it is desired to obtain polymer of high molecular weight within a reasonable time period, temperatures of 200° C. or more are generally required.

The catalysts used in the polymerisation are iron salts which are soluble in the polymerisable mixture or antimony pentachloride; the salts may be those of ferrous or ferric iron. Because the molecular weights of the polymers formed by this process generally increase with increase in the temperature at which polymerisation is effected, it is preferred to use catalysts which do not dissociate to inert products even at the higher temperatures of from 200° to 250° C. Antimony pentachloride tends to dissociate at about 170° C. and is therefore ineffective in producing high molecular weight products.

Examples of iron salts that may be used are ferric fluoride, ferric chloride, ferrous bromide, ferrous iodide, ferric orthophosphate and ferrous and ferric acetoacetonates. In general, we prefer to use the iron halides because of their useful catalytic activity and ferric chloride is particularly preferred because of its ready solubility in a wide variety of solvents, the ease with which it may be obtained in very pure form and because its use under suitable conditions consistently gives polymers of high molecular weight.

The catalysts are used in amounts of from 0.05 to 5% by weight of the polymerisable ingredients. Generally, amounts of less than 0.05% induce only very slow polymerisation but it is preferred to use not more than 1% by weight of catalyst because of the difficulty in removing the catalyst residues from the polymer. Amounts of from 0.1 to 0.5% are preferred.

As we have already stated, the high molecular weight polymers (which in general are those having the better all-round physical properties) are obtained within a reasonable period of time by effecting the polymerisation at high temperatures, generally of the order of 200° C. or above. This is because increase of molecular weight is accompanied by increase in softening point of the polymer and when the molecular weight of the polymer formed during the polymerisation becomes such that its softening point attains or surpasses the polymerisation temperature, the reaction mass will tend to solidify and polymerisation will then proceed only very slowly, if at all. However, we have now found that there is an undesirable tendency for the polymers to cross-link if they are subjected above certain temperatures, generally about 250° C. during polymerisation. On the other hand, only if the polymerisation temperature is maintained at or above about 250° C. are products of good physical strength consistently obtained. The cross-linked polymers are generally insoluble in all common solvents and tend to be intractable. They are therefore of little value as moulding, solvent-spinning or solvent-casting materials.

Therefore, as a further embodiment of our invention we provide an improved process for obtaining polymers of high molecular weight in which the polymerisable material is subjected in the presence of the catalyst to a temperature above its melting point but below that at which substantial cross-linking of the polymeric product would occur until the mixture becomes viscid or solid; cooling it, comminuting the cooled mixture, and thereafter reheating the comminuted product to a temperature below that at which substantial cross-linking would occur in order to complete the polymerisation.

In our preferred process the polymerisable material is charged into the polymerisation vessel and heated until it is molten. Where two or more compounds are used, they are thoroughly mixed together when molten. The polymerisation catalyst is then dissolved in the melt. In general, there is a short induction period and then rapid evolution of hydrogen halide (generally hydrogen chloride gas) denotes the commencement of polymerisation.

Since some of the reagents in the polymerisation process may react with water it is preferred, where products of high molecular weight are required, to rigorously exclude moisture from the reaction vessel during the polymerisation and, in our improved process, during the comminution step. It is also preferred to effect the reaction in the absence of air, for example by evacuating the reaction vessel or purging it with an inert gas such as nitrogen or both.

The course of the polymerisation may be followed by measuring the evolution of hydrogen halide.

After the addition of the catalyst, the molten mixture is maintained at an elevated temperature until it becomes a highly viscous mass or solidifies. In general, we have found that the polymeric material tends to cross-link if the polymerisation medium is subjected to temperatures above about 250° C. and therefore we prefer not to work above this temperature. In order to ensure that no cross-linking occurs, we prefer to operate the first stage of the polymerisation process at or below 200° C. until the product becomes viscid or solid.

The rapid increase in viscosity and eventual solidification of the melt is caused by the polymers attaining a molecular weight which gives them a softening point above the temperature of the polymerisation mixture. The time before solidification occurs depends upon the temperature of the melt; increase in temperature generally resulting in a reduction in the time required. Therefore we prefer to use as high a temperature as possible without cross-linking occurring. Temperatures of from 150° to 200° C. have been found generally suitable.

The melt generally forms a viscid or solid foamed mass in the reaction vessel and this mass is then cooled and ground to a fine powder. The comminution is effected under anhydrous conditions in order to avoid destroying the catalyst. Any suitable grinding means may be used. The fine powder is then reheated and maintained at an elevated temperature below that at which cross-linking would occur until polymerisation is complete. It is preferred that this heating step is effected under reduced pressure in order to aid the removal of the hydrogen chloride gas. Temperatures of from 150° to 250° C. are very suitable. The time required for the second heating step also depends upon the temperature of the heat treatment, higher temperatures requiring shorter times. Times of from 15 minutes to a few hours are normally very suitable, depending on the molecular weight required and the scale of the reaction. The end of the reaction is generally indicated by the cessation of evolution of hydrogen halide gas.

After the polymerisation, it is preferred to remove the catalyst residues from the product since their presence may cause discolouration and sometimes degradation. Any suitable process may be used. For example, the polymer may be ground down to powder and treated with hydrochloric acid in an alcohol, preferably methanol, under reflux. However, this process is frequently inadequate and removes only small amounts of the catalyst. Therefore we prefer to use the process described in our copending British application No. 38974/63 in which the polymer is dissolved in a suitable solvent such as dimethyl formamide or nitrobenzene and treated in solution with a complexing agent, preferably a chelating agent, for the catalyst. The complex is then separated from the polymer. The treated polymer may be re-precipitated by pouring the filtered solution into a suitable non-solvent for the polymer such as an alcohol, preferably methanol, or acetone, and is then thoroughly dried, preferably at elevated temperature and preferably under vacuum.

The products often tend to suffer from "setting-up" during processing operations which necessitate holding the polymers at elevated temperatures and particularly in molten form. It is believed that this setting-up which may be recognised by an increase in the viscosity of the melt, is due to decomposition of terminal sulphonyl or carbonyl halide groups to yield active points in the polymer chain. These active points precipitate a cross-linking reaction which may ultimately reduce the polymer to an insoluble, infusible mass which is useless for normal fabrication processes in plastic art, such as injection moulding, compression moulding or extrusion. The process of setting-up may be substantially reduced or eliminated entirely by the process described in our copending British application No. 38973/63, which comprises reacting the polymers in solution and below the temperature at which setting-up would occur with an organic compound having one or two groups per molecule which will react with the sulphonyl halide or carbonyl halide groups in the polymer to yield products which are stable at temperatures at which the polymer is molten. Suitable compounds are aromatic amines, particularly aniline, and the process may suitably be effected before, after or during the process for removing the catalysts from the polymer. In such cases, any excess of the compound may be removed from the polymer at the same time as the catalyst complexes.

THE POLYMERS

The products of the process are polymers containing repeating units wherein a sulphone group is tied to two aromatic residues. The un-crosslinked products are thermoplastic materials, generally of high softening point, which may be used in any suitable process known for fabricating plastic material. Those of high molecular weight may be tough solids which are substantially inert to a wide variety of chemicals, both acid and alkaline. They may be meltspun to give fibres and filaments or cast from solution in suitable solvents to give films. They may be admixed with other suitable ingredients such as pigments, heat and light stabilisers, plasticisers, lubricants, mould-release agents and fillers and may be blended with other polymeric materials if desired.

The process of the invention may be operated to produce a novel group of polysulphones which are of high softening point and of excellent thermal stability at high temperatures even above their softening points. The amorphous polymers of this group are soluble in a number of organic solvents, are strong, frequently transparent and are stable for long periods in molten form. They are, therefore, eminently suitable for fabrication by suitable plastics shaping processes such as injection and compression moulding and extrusion.

Thus, according to a further feature of our invention we provide new polymeric materials formed of repeating units having the structure —Ar—SO$_2$— where Ar is a divalent aromatic residue derived from benzene, a polynuclear hydrocarbon, diphenyl, a compound having the structure

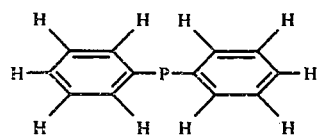

where P is —O—, —S—, —SO—, a divalent hydrocarbon radical, a substituted divalent hydrocarbon, a residue of a diol containing only carbon atoms or groups of the structure —C—O—C—, and —C—S—C—, in the chain between the hydroxyl groups, or substituted derivatives of any such aromatic residues wherein one or more of the hydrogen atoms bound to aromatic rings are substituted by other monovalent atoms or groups, and Ar may vary from unit to unit in the polymer chain. Where the residue is derived from a polynuclear aromatic hydrocarbon, we prefer it to be one containing not more than two aromatic nuclei since then the products are less likely to contain cross-linking.

Where these polymers are formed by our specified two component process e.g. using a disulphonyl halide compound of the structure X.SO$_2$—Ar—SO$_2$.X and a second compound having the structure H—Ar'—H (where Ar' has the same possibilities as Ar), they will have repeating units of the structure —Ar—SO$_2$-Ar'—SO$_2$— but where they are formed from our modified process using one or more compounds each having a single aromatically bound sulphonyl halide group and an aromatically bound hydrogen atom, they will comprise randomly distributed units of the structure —Ar—SO$_2$— where Ar may vary from unit to unit in the chain.

It will be appreciated that in the first mentioned process two or more disulphonyl halide compounds of the general structure X.SO$_2$—Ar—SO$_2$.X may be reacted with one or more aromatic compounds of the general structure H—Ar'—H.

As a further feature of our invention we provide polymers having repeating units of the structure —Ar—SO$_2$— as hereinbefore defined and units of the structure —Ar—CO— where Ar has the possibilities listed above.

Polymers containing units of the structure —Ar—CO—, even when Ar comprises two benzene nuclei linked by a bridging group, tend to be crystalline in character.

Because of their ready preparation and good physical properties, our preferred polymers are those in which the residues Ar are derived from benzene, diphenyl, compounds having the structure

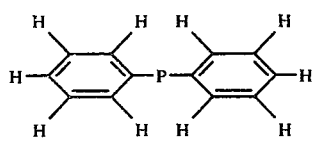

IV or derivatives of such residues wherein one or more of the aromatically bound hydrogen atoms are substituted by other monovalent atoms or groups. Of these polymers, we further prefer those in which at least some of the residues Ar are residues derived from compounds of the structure IV or are derivatives of such residues wherein one or more of the aromatically bound hydrogen atoms are substituted by other monovalent atoms or groups as these polymers are particularly suitable for moulding to give strong, transparent products of high softening point.

We prefer that where substituted derivatives of the residues are present in the polymer chain, the substituents are halogen atoms or lower hydrocarbon, ether or thioether groups or halogenated derivatives of these groups as the polymeric products are then inert to a wide variety of chemicals. We particularly prefer the substituents, if any, to be halogen atoms, alkyl groups containing from 1 to 4 carbon atoms or alkoxy groups containing from 1 to 4 carbon atoms. We further prefer those polymers in which the aromatically bound hydrogen atoms are substituted, if at all, only on the carbon atoms meta to the —SO$_2$— linkages because of their ease of preparation. On the whole, we prefer those polymers in which none of the aromatically bound hydrogen atoms have been replaced by other atoms or groups because of their remarkable inertness to acid or alkaline chemicals even at very high temperatures.

Those polymers having aromatic residues of the structure IV in which P is oxygen, sulphur, a diol residue containing up to 4 carbon atoms, or a divalent aliphatic hydrocarbon radical containing from 1 to 4 carbon atoms in the chain between the aromatic nuclei and not more than 10 carbon atoms altogether are formed from readily available monomers. Derivatives of such monomers where one or more of the aromatically-bound hydrogen atoms ortho to the bridging group P have been substituted by haloge atoms or alkyl or alkoxy groups containing from 1 to 4 carbon atoms are also readily available.

Our preferred polymers which are generally thermally stable at very high temperatures, even above their melting points consist of repeating units having the structure

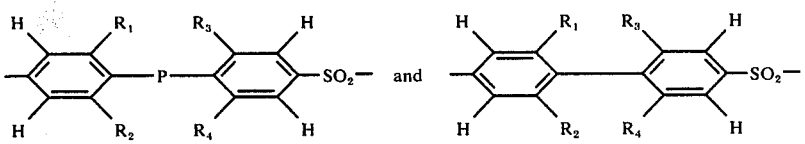

where P is oxygen atom or a sulphur atom, and $R_1$, $R_2$, $R_3$ and $R_4$ are each selected from the group consisting of halogen atoms, alkyl groups containing from 1 to 4 carbon atoms and alkoxy groups containing 1 to 4 carbon atoms.

Particular examples of such polymers are those formed from a combination of units having the structure

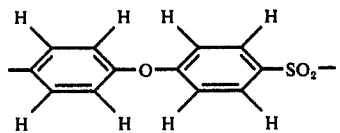  V and units having the structure

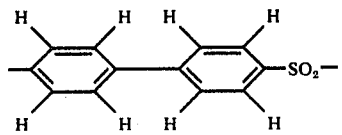  VI

In general, we have found that increase of the number of units having the structure VI increases the softening point of our preferred copolymers but also endows them with an increasingly brittle nature. Those of our preferred polymers in which these units comprise more than 80% of the total of units tend to be crystalline, insoluble and fabricated only with difficulty by standard plastic shaping processes. On the other hand, polymers containing below 5% of such units tend to have low softening points. Therefore, we prefer those of our preferred polymers in which the said units comprise from 5 to 80% of the total number of units.

Those containing about 30% of such units have a very suitable combination of softening point and tensile properties.

Our specified polymers have remarkably high softening points, frequently of the order of 300° C. or higher, are thermoplastic and, after treatment to prevent them setting-up are stable for long periods in the melt. The amorphous polymers are particularly suitable for fabrication at their softening point without degradation to give shaped products which are generally strong, transparent and inert to a wide variety of chemicals, both acid and alkaline, even at temperatures near their softening point. They may be melt spun to yield fibres and filaments which may be used in applications where resistance to chemical and high temperatures is desired, for example in the manufacture of protective clothing, and they may be extruded to give strong, transparent films which can withstand flexing and are suitable for wrapping or in electrical applications where their high softening points are particularly advantageous. They may be shaped by any suitable process to give hard, strong, transparent mouldings having good stability to thermal degradation at temperatures as high as 300° C. The shaped products may be used, for example, as electrical insulants, for instance in transformer parts, switch gear and condensers.

Many of the products are soluble in polar organic solvents such as nitrobenzene and dimethyl formamide. Fibres and films may be formed from the solutions and coatings deposited from the solutions, e.g. on wire, give good electrical insulation. The coated products may be used in conditions where elevated temperatures are encountered, for instance in electrical transformers and high voltage switch gear. Those of our products with molecular weights equivalent to reduce viscosities (measured on a solution of 1 gm. of the polymer in 100 ccs. of dimethyl formamide at 25° C.) of 0.6 or more have a combination of physical properties such as tensile strength, modulus and softening point that makes them particularly suitable as moulding materials. We prefer polymers that are to be used in applications which make use of their strength to have reduced viscosities of at least 1.0.

The polymers show good adhesion to surfaces such as glass and metals and adhere particularly well to glass. Thus, they may be used as high temperature thermoplastic adhesives for joining metal (e.g. stainless steel) parts, for example, in the manufacture of household goods such as ovens, irons and the like.

The polymers may be mixed with other suitable ingredients such as dyes, pigments, heat and light stabilisers, plasticisers, mould-release agents, lubricants and fillers and may be blended with other polymeric materials if desired.

The invention is illustrated by the following Examples in which all parts are expressed as parts by weight.

EXAMPLE 1

734.84 parts (2 moles) of diphenyl ether-4,4'-disulphonylchloride were fused with 308.52 (2 moles) parts of diphenyl at 90° C. under a slow stream of nitrogen in a heated vessel and after stirring for 30 minutes, 4 parts of freshly sublimed ferric chloride were added to the melt. The catalyst dissolved rapidly on stirring with vigorous evolution of hydrogen chloride. The reaction temperature was raised rapidly but the mixture solidified at a bath temperature of about 180° C. The reaction temperature was raised further to 280° C. at which temperature the mixture was still solid. The total reaction time was 40 minutes.

The mixture was allowed to cool and the product was then broken up and stirred with 7850 parts of boiling isopropanol. The insoluble product was filtered off and the process was repeated twice. On drying, the yield was 880 parts of a polymer having a reduced viscosity measured as a 1% solution in dimethyl formamide at 25° C. of 0.15. The polymer was shown to be amorphous by X-ray examination and could be solvent cast from dimethyl formamide to give transparent films.

EXAMPLE 2

530.64 parts (about 1.5 moles) of diphenyl ether-4,4'-disulphonyl chloride, 137.76 parts (0.5 mole) of benzene-1,3-disulphonyl chloride and 307.56 parts (about 2 moles) of diphenyl were fused together at 90° C. under a slow stream of nitrogen in a heated vessel. After stirring for 30 minutes, 6.5 parts of ferric chloride were added and vigorous evolution of hydrogen chloride began. The reaction temperature was raised until after a further 20 minutes it reached 280° C. It was then raised slowly to 300° C. and held there for 40 minutes. The total reaction time was 95 minutes.

The product was treated as for Example 1 to give 870 parts of a clear, tough polymer having a reduced viscosity of 0.30. The polymer was shown to be amorphous by X-ray examinations and could be solvent cast to give strong films.

EXAMPLE 3

551.94 parts (1.5 moles) of diphenyl ether-4,4'-disulphonyl chloride, 137.64 parts (0.5 mole) of benzene-1,3-disulphonyl chloride and 308.27 parts (2 moles) of diphenyl were dissolved in 5650 parts of dry nitromethane at 95° C. under a slow stream of nitrogen and the mixture was stirred. After 10 minutes, 15 parts of ferric chloride were added and slow evolution of hydrogen chloride began. The stirred mixture was heated under reflux for 6 hours during which time the polymer was precipitated from solution as a fine powder.

The powder was filtered off and treated as in Example 1 to give 260 parts of a polymer having a reduced viscosity of 0.041.

EXAMPLE 4

729.10 parts (about 2 moles) of diphenyl ether-4,4'-disulphonyl chloride and 315.8 parts (about 2 moles) of diphenyl were dissolved in 7567 parts of cyclic tetramethylene sulphone at 105° C. and the mixture was stirred under a slow stream nitrogen. After 10 minutes stirring 8 parts of ferric chloride were added as a solution in 630 parts of cyclic tetramethylene sulphone. Slow evolution of hydrogen chloride began and the reaction temperature was raised slowly to 210° C. over a period of 4 hours and held there for a further 3 hours. The mixture was then cooled and poured into excess stirred iso-propanol and the insoluble product was filtered off and treated as in Example 1 to give 520 parts of a polymer having a reduced viscosity of 0.07.

The results of this Example and Example 3 indicate that only low molecular weight products may be obtained from polymerisation in solution.

EXAMPLE 5

367.24 parts (1mole) of diphenyl ether-4,4'-disulphonyl chloride, 275.17 parts (1 mole) of benzene-1,3-disulphonyl chloride and 308.40 parts (2 moles) of diphenyl were fused and stirred at 100° C. under a slow stream of nitrogen. After 10 minutes 2 parts of ferric chloride were added. There was brisk evolution of hydrogen chloride. Over a period of 1 hour, the temperature of the reaction was raised to 320° C. at which temperature the product was a very viscous liquid. The mixture was held for a further 45 minutes at 320° C. under a vacuum of 0.7 mm. of Hg. and then cooled.

The product was ground to a fine powder, dissolved in a hot mixture of 9530 parts of dimethyl formamide and 195.2 parts of acetyl acetone and filtered into a stirred excess of ethanol to precipitate the polymer. The product was 520 parts of a polymer which was found to be insoluble in cold solvents. The rather low yield in this and following Examples 6 to 12 is due to a certain amount of cross-linking occuring at the high temperatures of the polymerisation, yielding some insoluble polymer which was removed during the filtration step.

EXAMPLE 6

367.24 parts (1 mole) of diphenyl ether-4,4'-disulphonyl chloride, 154.20 parts (1 mole) of benzene-1,3-disulphonyl chloride and 340.40 parts (2 moles) of diphenyl ether were fused at 120° C. under a slow stream of nitrogen. 2 parts of ferric chloride were added and the mixture stirred to dissolve the catalyst. There was vigorous evolution of hydrogen chloride. The polymerisation and treatment of the polymer were as for Example 5 and the yield was 620 parts of a polymer insoluble in cold solvents.

EXAMPLE 7

769.16 parts (2 moles) of diphenyl ether-4,4'-disulphonyl chloride and 356.72 parts (2 moles) of diphenyl ether were fused and stirred at 100° C. under a slow stream of nitrogen. After 10 minutes, 1.7 parts of ferric chloride were added and there was brisk evolution of hydrogen chloride. The polymerisation and treatment of the polymer was as for Example 5 and the yield was 820 parts of a polymer having a reduced viscosity of 0.61 and a softening point of about 320° C.

EXAMPLE 8

The process of Example 7 was repeated and the product was ground to a fine powder, dissolved in a hot mixture of dimethyl formamide and acetyl and filtered into a stirred excess of acetone to precipitate the polymer. A polymeric product was obtained having a reduced viscosity of 0.76 and a softening point of about 320° C.

EXAMPLE 9

735 parts (2 moles) diphenyl ether-4,4'-disulphonyl chloride and 340 parts (2 moles) of diphenyl ether were fused together at 110° C. and stirred for 10 minutes under a slow stream of nitrogen. 3.3 parts of ferric acetoacetonate were then added to the mixture and the temperature of the whole was raised slowly over a period of 4 hours 15 minutes to 290° C. The mixture was then subjected to a vacuum of 0.3 mm. of Hg. and the temperature raised slowly to 320° C. over a period of 25 minutes and held there for a further 20 minutes. The melt was then cooled and the resultant solid ground to a powder and stirred and refluxed with 7850 parts of isopropyl alcohol and 488 parts of acetyl acetone. The polymer was then filtered off, washed and dried to yield 580 parts of a polymer having a reduced viscosity of 0.28. The polymer was soluble in nitrobenzene and dimethyl formamide and could be solvent cast to give transparent films.

EXAMPLE 10

The process of Example 9 was repeated using 10 parts of antimony pentachloride as catalyst. The temperature of the polymerisation was eventually raised to 340° C. over a period of 3 hours 10 minutes and the product was a polymer having a reduced viscosity of 0.21.

EXAMPLE 11

The process of Example 10 was repeated except that the fusion temperature of the mixture when the catalyst was added was 130° C. and 48 parts of antimony pentachloride were used. The polymerisation temperature was maintained at 130° C. for a further 34 minutes and then raised slowly to 310° C. over a period of 2 hours. The melt was then subjected to a vacuum of 0.3 mm. of Hg. for 10 minutes at 310° C. before being cooled.

The solid product was ground to a powder and dissolved in 9530 parts dimethyl formamide and the solution was filtered into an excess of methanol in order to precipitate the polymer. The precipitate was washed and dried at 80° C. for 3 hours under vacuum to yield 520 parts of a polymer having a reduced viscosity of 0.32.

EXAMPLE 12

367.24 parts (1 mole) of diphenyl ether-4,4'-disulphonyl chloride and 402.42 parts (1 mole) of 4,4°-diphenoxy diphenylsulphone were fused together at 140° C. and stirred under a slow stream of nitrogen for 10 minutes when 8 parts of ferric chloride were added as catalyst. The temperature was raised to 310° C. for 2 hours after which a sample (Sample I) was removed from the melt. The remaining mixture was subjected to a vacuum of 0.3 mm. Hg. for a further 45 minutes at 310° C. before cooling to give Sample II.

Both the samples were worked up as described in Example 11 and Sample I gave a polymer with a reduced viscosity of 0.37 while that of Sample 2 was 0.47.

EXAMPLE 13

619.30 parts (2 moles) of chlorobenzene-2,4-disulphonyl chloride, 185.44 parts (1.2 moles) of diphenyl and 139.40 parts (0.8 mole) of diphenyl ether were fused at 140° C. and stirred under a slow stream of nitrogen for 10 minutes before adding 4.1 parts of ferric chloride as catalyst as a 4.1% solution in tetrahydrofuran. The polymerisation temperature was raised slowly to 190° C. over a period of 2 hours 15 minutes and to 230° C. 20 minutes later when the product was still molten. The melt was cooled and the product ground to a powder, suspended in a mixture of isopropyl alcohol and acetyl acetone, reprecipitated and dried to give a black polymer.

EXAMPLE 14

2.7 parts of dry diphenyl ether-4-sulphonyl chloride (melting point 44° C.) were fused in a closed vessel containing a nitrogen inlet and outlet under an atmosphere of dry nitrogen and 0.09 part of dry ferric chloride was dissolved in the molten monomer. Moisture was rigorously excluded from the reaction vessel. Evolution of hydrogen chloride gas commenced almost at once. After 7 minutes, the temperature was raised to 180° C. and by that time 72% of the theoretical total amount of hydrogen chloride had been evolved. The reaction mixture, which had formed a very viscous foam, part solid, was cooled to a solid and powdered under an atmosphere of dry nitrogen and then the polymerisation was recommenced by heating the powder to 110° C. The temperature was raised to 180° C. over a further 10 minutes when it was again reduced and the product again powdered. The reaction was continued by heating the powder initially to 150° C. under high vacuum and thereafter to 240° C. over a period of 15 minutes. The mass was held at this temperature for 20 minutes before being cooled, dissolved in 30 parts of dimethyl formamide and filtered. The polymer was precipitated by pouring the solution into a stirred mixture of 240 parts of acetone containing 30 parts of concentration hydrochloric acid. The precipitated polymer was filtered, washed with methanol and dried overnight at 60° C. under vacuum to give 1.8 parts of poly(p-sulphonyl diphenyl ether) having a reduced viscosity, measured as a 1% solution in dimethyl formamide at 25° C. of 1.2.

Samples of this polymer were compression moulded at 310° C. and 20 tons per square inch pressure to form tough, transparent films of good quality which could be creased repeatedly without fracture.

The dynamic mechanical moduli of the polymer were measured ar various temperatures by the cantilever vibration method at 100 cycles. The modulus dropped only slightly from $3.8 \times 10^{10}$ dynes/cm$^2$ at $-150°$ C. to $1.9 \times 10^{10}$ at $+220°$ C.

EXAMPLE 15

2.8 parts of diphenyl ether-4-sulphonyl chloride were fused at 80° C. under dry nitrogen and 0.085 part of ferric chloride was then added. Moisture was rigorously excluded from the reaction vessel. After 10 minutes the temperature was raised to 200° C. when 68% of the theoretical amount of hydrogen chloride gas had been evolved. The mixture, which was in the form of a viscid foam, was cooled to a solid and powdered under dry nitrogen and polymerisation was recommenced by heating the powder to 100° C. under an absolute pressure of 0.1 mm. of mercury. The temperature was raised rapidly to 220° C. and held there for 2 hours then increased again to 240° C. for a further 90 minutes after which the mass was cooled, dissolved in 30 parts of hot dimethyl formamide and filtered and the polymer was precipitated by pouring the solution into stirred chloroform. The precipitate was filtered, washed with methanol and dried for 1 hour at 200° C. under high vacuum to give 1.8 parts of a polymer having a reduced viscosity of 1.35, measured as a 1% solution is dimethyl formamide at 25° C.

Clear, transparent films were cast from a 10% solution of the polymer in nitrobenzene and were found to be tough down to −60° C.

EXAMPLE 16

3.5 parts of diphenyl ether-4-sulphonyl chloride were fused at 80° C. under dry nitrogen and 0.09 part of ferric chloride was added to the melt. Moisture was rigorously excluded from the reaction vessel. After 10 minutes, the temperature had been raised to 180° C. and the reaction was 78% complete, calculated on hydrogen chloride evolution. The viscid foamed mass was cooled to a solid, powdered and reheated to 150° C. under high vacuum. The temperature was increased to 240° C. over a period of ten minutes and held at a temperature of 240° – 250° C. for a further 30 minutes before cooling the mass. The cold polymer was dissolved in 40 parts of dimethyl formamide, precipitated by pouring the solution into 300 parts of well stirred 5N hydrochloric acid, filtered, washed with methanol and dried overnight at 60° C. under vacuum to give 2.8 parts of a polymer having a reduced viscosity of 0.99 as measured as a 1% solution in dimethyl formamide at 25° C.

The melt viscosity of the polymer was measured as $2.3 \times 10^5$ poises at a constant shear stress of $8.2 \times 10^5$ dynes/sq. cm. at 350° C.

EXAMPLE 17

Using the process of Example 3, 2.9 parts of diphenyl ether-4-sulphonyl chloride were polymerised using 0.07 part of ferric chloride as catalyst. The temperature was raised to 170° C. over 9 minutes when the polymerization was calculated to be 67% complete by the measurement of hydrogen chloride evolution. The resultant highly viscous mass was cooled to a solid, powdered and reheated to 150° C. After 12 minutes at this temperature, the mass was cooled and powdered again and reheated slowly to 250° C. under high vacuum over a period of 30 minutes. The mass was held at 250° C. for a further 10 minutes, cooled and worked up by the method described in Example 3, to give 2.3 parts of a polymer having a reduced viscosity of 0.78 measured as a 1% solution in dimethyl formamide at 25° C.

EXAMPLE 18

33.3 parts of diphenyl ether-4-sulphonyl chloride were mixed with 0.8 part of freshly sublimed ferric chloride and heated to 200° C. over 15 minutes and then held at 200° C. for 2 hours with a slow stream of dry nitrogen passing over the reaction mixture. During this time 96% of the theoretical amount of hydrogen chloride was evolved. The product, which was a brown foamed mass, was powdered and then heated at 230° – 234° C. under an absolute pressure of 0.9 mm. of mercury for 5 hours. The resulting brown polymer was dissolved in 300 parts of dry dimethyl formamide and 1 part of aniline and shaken for 15 minutes. Four parts of 8-hydroxy quinoline-5-sulphonic acid were added and shaking continued for a further 30 minutes. The solution was then passed down a 10½ inch long, 1½ inch diameter column packed with Spence 100 – 200 mesh type H alumina. The intense dark green iron complex was absorbed on the first 2 inches of the column. After the solution had been passed through the column, any absorbed polymer was washed through with a further 150 parts of dimethyl formamide. The polymer was precipitated from the almost colourless solution by addition to 2500 parts of well stirred 5% aqueous hydrochloric acid. The white precipitate was filtered off, washed twice with 500 parts of distilled water and once with 250 parts of methanol and finally dried at 120° in vacuum for 16 hours to give 25.6 parts of polymer. Analysis showed that the polysulphone contained less than 20 parts per million of iron. The polymer could be held at 320° C. for several minutes without any detectable increase in viscosity and clear, very pale yellow films were moulded from the product at 320° C.

EXAMPLE 19

35 parts of diphenyl ether-4-sulphonyl chloride were polymerised by the process described in Example 18 using 1.62 parts of ferric chloride as catalyst. The crude product was dissolved in 300 parts of dimethyl formamide at room temperature and the solution was dissolved into four equal parts each of which was shaken with one part of analine for 15 minutes. To each of three of the four parts was added the chelating agent disclosed in the table below and the four parts were each filtered through the alumina column described in Example 18 and the polymer was precipitated from each and worked up by the process described in Example 18. The results are set out below.

| Solution | Additional Chelating Agent | Amount used (parts by weight) | Concentration of iron in polymer (ppm) |
|---|---|---|---|
| A | None | — | 70 |
| B | 8-hydroxyquinoline-5-sulphonic acid | 2.8 | 20 |
| C | dimethyl glyoxime | 0.7 | 30 |
| D | ethylene diamine tetraacetic acid | 1.8 | 30 |

In each case the polymer obtained had a reduced viscosity of 0.72. All four samples could be held in the melt for long periods (up to 20 minutes or more) without any detectable increase in viscosity.

EXAMPLE 20

7.73 parts of diphenyl ether-4-sulphonyl chloride and 13.09 parts of diphenyl-4-sulphonyl chloride were fused together at 130° C. under nitrogen. 0.39 part of ferric chloride was added to the melt and the temperature slowly raised to 180° C. over a period of 26 minutes during which period 80% of the theoretical amount of hydrogen chloride was evolved. The foamed mass was cooled and powdered and the powder was re-heated to 140° C. under vacuum, and then heated further to 210° C. over a period of 25 minutes. The mass was cooled and powdered again and heated once more to 120° C. under vacuum. The temperature was raised to 240° C. over a period of 12 minutes and held at 240° – 250° C. for 130 minutes. The mass was then cooled, dissolved in 220 parts of dimethyl formamide to which was added 2.0 parts of aniline and 1.8 parts of 8-hydroxyquinoline-5-sulphonic acid. The mixture was shaken for 20 minutes and then passed through the alumina column described in Example 18. The polymer was precipitated by pouring the solution obtained into dilute hydrochloric acid and was washed twice with hot methanol and dried for 18 hours at 100° C. under vacuum to yield 16.7 parts of a copolymer having a reduced viscosity of 0.91 and a very high softening point, higher than 300° C. and containing only 20 parts per million of iron.

An almost clear, colourless transparent film was cast from a solution of this polymer in nitrobenzene at 90° C.

EXAMPLE 21

A series of polysulphones were prepared following the process described in Example 20 but using varying amounts of diphenyl ether-4-sulphonyl chloride and diphenyl-4-sulphonyl chloride. Some properties of the products are set out below.

| % diphenyl ether sulphone groups in copolymer (by I.R. analysis) | Form[1] | Modulus[2] dynes/sq.cm. −150° C. | +200° C. | Softening point |
|---|---|---|---|---|
| 100 | a. s. | $3.8 \times 10^{10}$ | $1.9 \times 10^{10}$ | about 240° C. |
| 84 | a. s. | $2.6 \times 10^{10}$ | $1.6 \times 10^{10}$ | > 250° C. |
| 74 | a. s. | $3.9 \times 10^{10}$ | $2.0 \times 10^{10}$ | > 250° C. |
| 43 | a. s. | $2.1 \times 10^{10}$ | $1.3 \times 10^{10}$ | > 250° C. |
| 23 | a. s. | not measured | | > 250° C. |
| 0* | c. i. | $1.4 \times 10^{10}$ | $1.2 \times 10^{10}$ | > 250° C. |

[1]a = amorphous  c = crystalline
 s = soluble     i = insoluble
[2]Measured by the cantilever vibration method described by Robinson in J. Sci. Instruments 32, page 2, 1955
*This polymer did not foam during the polymerisation process.

All the amorphous copolymers could be solvent cast to give strong films but the films became more and more brittle with decrease in the amount of diphenyl ether sulphone radicals in the polymer.

EXAMPLE 22

295 parts of diphenyl sulphide-4-sulphonyl chloride (melting point 73.5° C.) were fused at 120° C. under dry nitrogen and 5.4 parts of freshly sublimed ferric chloride were added to the melt. The temperature was raised to 180° C. over a period of 12 minutes at the end of which time the amount of hydrogen chloride evolved was found to be 74% of theoretical. The product was cooled, powdered and heated under high vacuum at a temperature rising from 140° to 230° C. over a period of 14 minutes. The reaction mixture was finally held at 230° −240° C. for 105 minutes, thereafter cooled and dissolved in about 5000 parts of dimethyl formamide. 51 parts of aniline were added to the solution followed by 35 parts of 8-hydroxyquinoline-5-sulphonic acid. The mixture was shaken and then filtered through the alumina-packed column described in Example 18. The polymer was precipitated into dilute hydrochloric acid, washed with hot methanol and dried at 100° C. under vacuum to yield 210 parts of a polymer having a reduced viscosity (measured on a solution of 1 gm. of the polymer in 100 ccs. of dimethyl formamide at 50° C.) of 0.56. X-ray examination showed the polymer to be amorphous.

EXAMPLE 23

In each of a series of experiments 267 parts of diphenyl ether-4-sulphonyl chloride were heated with a catalyst (identified below) at 150° C. for 40 minutes to yield a foamed mass which was cooled, powdered and reheated under high vacuum (about 0.2 mm. Hg. absolute pressure) to a temperature of 230° C. over a period of 15 minutes. The reaction mixture was finally held at 230° C. for 1 hour before it was cooled, dissolved in about 3000 parts of dimethyl formamide and treated as described in Example 22 with 30.6 parts of aniline and 22 parts of 8-hydroxyquinoline-5-sulphonic acid. In each case the polymer obtained had a reduced viscosity (measured on a solution of 1 gm. of polymer in 100 ccs. of dimethyl formamide at 25° C.) in the range of 0.1 to 0.2.

| Experiment | Catalyst | amount used |
|---|---|---|
| A | Ferric orthophosphate | 6.7 parts |
| B | Ferric fluoride | 3.4 parts |
| C | Ferrous bromide | 6.5 parts |
| D | Ferrous iodide | 9.3 parts |

EXAMPLE 24

15.1 parts of 4-phenoxybenzoyl chloride (boiling point 146° C. at 0.4 mm. Hg.) and 27.1 parts of diphenyl ether-4-sulphonyl chloride (melting point 44° C.) were heated to 130° C. under a slow current of dry nitrogen. 1.4 parts of freshly sublimed ferric chloride were dissolved in the melt and the temperature was raised to 220° C. over a period of 75 minutes when it was found that 79% of the theoretical amount of hydrogen had been evolved. The mixture was cooled to yield a brittle foam which was powdered and reheated to 230° to 240° C. for 40 minutes under high vacuum. The mixture was then cooled again, ground to a powder, washed with cold dimethyl formamide followed by methanol and dried at 80° C. for 2 hours under vacuum to yield 29 parts of a crystalline polymer.

Infra-red analysis (by comparison with standard mixtures of homopolymers derived from each of the polymerisable monomers) showed the product to contain 35% by weight of units having the structure

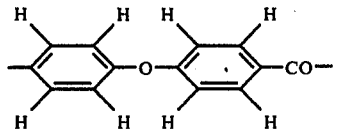

Analysis of the sulphur content of the polymer showed it to contain 36% by weight of these units.

EXAMPLE 25

41.7 parts of 4-phenoxybenzoyl chloride and 5.3 parts of diphenyl ether-4-sulphonyl chloride were melted together at 170° C. and 2.5 parts of freshly sublimed ferric chloride were dissolved in the melt. After 2¾ hours at 170° C, 86% of the theoretical amount of hydrogen chloride had been evolved and the mixture was cooled, powdered and reheated to 240° C. for 90 minutes under high vacuum (0.1 mm. Hg. abolute pressure). The product was cooled, ground to a powder, washed with hot acetone and dried overnight at 90° C. under vacuum to yield 36 parts of a polymer partially soluble in nitrobenzene and soluble in 4,4'-diphenoxy diphenylsulphone at 200° C.

Infra-red analysis by the method described in Example 24 showed the polymer to contain 90% by weight of units having the structure

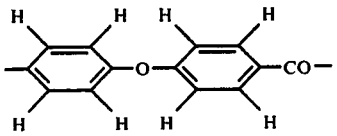

The polymer was highly crystalline, the crystal form being that of the homopolymer derived from 4-phenoxybenzoyl chloride.

EXAMPLE 26

A series of polymerisations were effected following the process of Example 25 but using varying concentrations of monomers and catalyst. The concentrations of each monomer and the catalyst and the form of the products obtained are set out below

| Experiment | Monomers* I | II | Catalyst | Weight % of units from I in polymer | Form of polymer |
|---|---|---|---|---|---|
| A | 37.0 | 10.7 | 2.2 | 78 | Crystalline |
| B | 32.4 | 16.1 | 2.4 | 67 | Crystalline |
| C | 23.2 | 26.7 | 1.8 | 46 | Crystalline |

*I = 4-phenoxybenzoyl chloride
II = diphenyl ether-4-sulphonyl chloride

I claim:
1. Switch gear containing as electrical insulant a shaped polymeric material formed of repeating units having the structure —Ar—SO₂— where Ar is a divalent aromatic residue derived from benzene, a polynuclear hydrocarbon, diphenyl, a compound having the structure

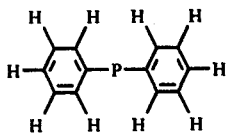

where P is —O—, —S—, —SO—, a divalent hydrocarbon radical, a substituted divalent hydrocarbon radical or a residue of a diol containing only carbon atoms or groups of the structure —C—O—C— or —C—S—C— in the chain between the hydroxyl groups, or substituted derivatives of any such aromatic residues in which one or more of the hydrogen atoms bound to the aromatic rings are substituted by other monovalent atoms or groups, and Ar may vary from unit to unit in the polymer chain.

2. Switch gear according to claim 1 containing as electrical insulant a shaped polymeric material formed of repeating units having the structure —Ar—SO₂— where Ar is a divalent aromatic residue derived from benzene, a polynuclear hydrocarbon containing not more than two aromatic rings, diphenyl, a compound having the structure

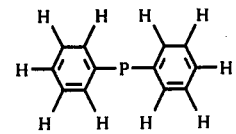

where P is —O—, —S—, —SO—, a divalent hydrocarbon radical, a substituted divalent hydrocarbon radical or a residue of a diol containing only carbon atoms or groups of the structure —C—O—C— or —C—S—C— in the chain between the hydroxyl groups, or substituted derivatives of any such aromatic residues in which one or more of the hydrogen atoms bound to the aromatic rings are substituted by halogen atoms, alkyl groups containing from 1 to 4 carbon atoms or alkoxy groups containing from 1 to 4 carbon atoms, and Ar may vary from unit to unit in the polymer chain.

3. Switch gear according to claim 2 containing as electrical insulant a shaped polymeric material according to claim 2 in which at least some of the repeating units are derived from compounds having the structure

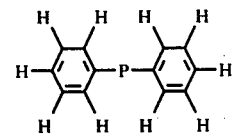

where P is —O—, —S—, —SO—, a divalent hydrocarbon radical, a substituted divalent hydrocarbon radical or a residue of a diol containing only carbon atoms or groups of the structure —C—O—C— or —C—S—C in the chain between the hydroxyl groups, or substituted derivatives of any such aromatic residues in which one or more of the hydrogen atoms bound to the aromatic rings are substituted by halogen atoms, alkyl groups containing from 1 to 4 carbon atoms or alkoxy groups containing from 1 to 4 carbon atoms.

4. Switch gear according to claim 1 containing as electrical insulant a shaped polymeric material formed of repeating units having the structure —Ar—SO₂— where Ar is a divalent aromatic nucleus of the structure

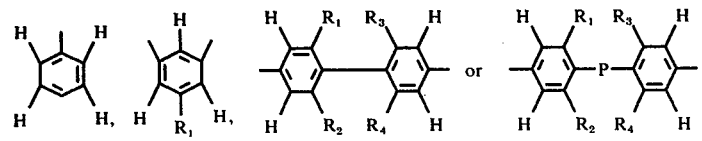

where P is —O— or —S— and R₁, R₂, R₃, and R₄ are selected from the group consisting of hydrogen atoms, halogen atoms, alkyl groups having from 1 to 4 carbon atoms and alkoxy groups having from 1 to 4 carbon atoms and Ar may vary from unit to unit in the polymer chain.

5. Switch gear according to claim 1 containing as electrical insulant a shaped polymeric material formed of repeating units having the structure —Ar—SO₂— where Ar is a divalent aromatic nucleus of the structure

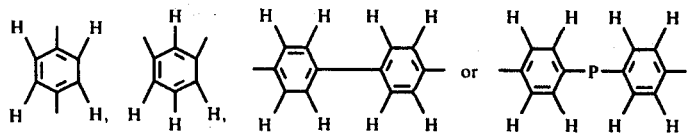

where P is —O— or —S—.

6. Switch gear according to claim 1 containing as electrical insulant a shaped polymeric material formed of repeating units having the structure

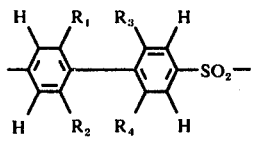

and repeating units having the structure

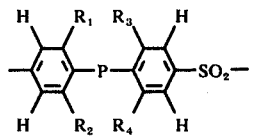

where P is —O— or —S— and $R_1$, $R_2$, and $R_3$, and $R_4$ are selected from the group consisting of hydrogen atoms, halogen atoms, alkyl groups having from 1 to 4 carbon atoms and alkoxy groups having from 1 to 4 carbon atoms.

7. Switch gear containing as electrical insulant a shaped polymeric material according to claim 6 in which from 5 to 80 for every 100 units in the polymer chain have the structure

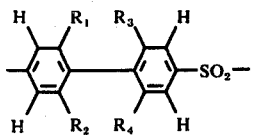

where $R_1$, $R_2$, $R_3$ and $R_4$ are selected from the group consisting of hydrogen atoms, halogen atoms, alkyl groups having from 1 to 4 carbon atoms and alkoxy groups having from 1 to 4 carbon atoms.

8. Switch gear containing as electrical insulant a shaped polymeric material according to claim 6 formed of repeating units having the structure

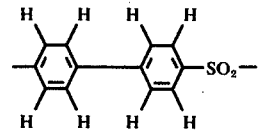

and repeating units having the structure

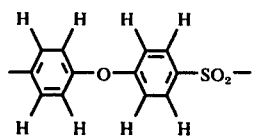

9. Switch gear according to claim 1 containing as electrical insulant a shaped polymeric material formed of repeating units having the structure

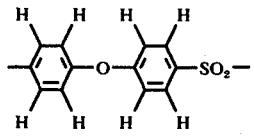

10. Switch gear according to claim 1 containing as electrical insulant a shaped polymeric material formed of repeating units having the structure

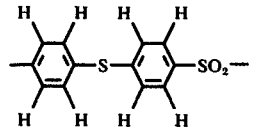

11. Switch gear containing as electrical insulant a shaped polymeric material according to claim 1 having a reduced viscosity of at least 0.6, measured on a solution of 1g of the polymer in 100 cm³ of dimethyl formamide at 25° C.

* * * * *

UNITED STATES PATENT OFFICE
CERTIFICATE OF CORRECTION

Patent No. 4,008,204     Dated February 15, 1977

Inventor(s) Michael Edward Benet Jones

It is certified that error appears in the above-identified patent and that said Letters Patent are hereby corrected as shown below:

Column 3,
lines 31-36: the formula should read as follows:

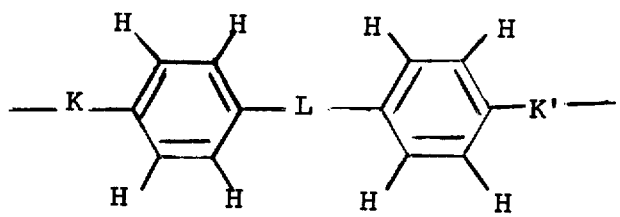

Column 11,
line 4:      "1 t 4" should be --1 to 4--

Column 11,
line 10:     "haloge" should be --halogen--

UNITED STATES PATENT OFFICE
CERTIFICATE OF CORRECTION

Patent No. 4,008,204          Dated February 15, 1977

Inventor(s) Michael Edward Benet Jones

It is certified that error appears in the above-identified patent and that said Letters Patent are hereby corrected as shown below:

Column 22, lines 51-60: the left-hand formula should read as follows:

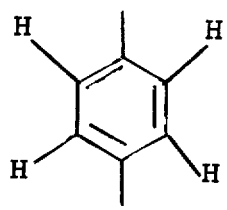

Signed and Sealed this second Day of August 1977

[SEAL]

Attest:

RUTH C. MASON
*Attesting Officer*

C. MARSHALL DANN
*Commissioner of Patents and Trademarks*